US010829592B2

(12) United States Patent
Yoon et al.

(10) Patent No.: US 10,829,592 B2
(45) Date of Patent: Nov. 10, 2020

(54) METHOD FOR PREPARING POLYANILINE COMPLEX WITH ANTIMICROBIAL ACTIVITY AND HEAVY METAL REMOVAL EFFICIENCY USING CONDUCTIVE POLY ANILINE POLYMER DOPED WITH ORGANIC ACID AND METAL ION IN DEFINED ORDER

(71) Applicants: PARA CO., LTD., Hwaseong-si (KR); Ho Sung Yoon, Hwaseong-si (KR)

(72) Inventors: Ho Sung Yoon, Hwaseong-si (KR); Chan Woo Lee, Seoul (KR)

(73) Assignees: PARA CO., LTD., Hwaseong-si (KR); Ho Sung Yoon, Hwaseong-si (KR)

( * ) Notice: Subject to any disclaimer, the term of this patent is extended or adjusted under 35 U.S.C. 154(b) by 35 days.

(21) Appl. No.: 16/174,817

(22) Filed: Oct. 30, 2018

(65) Prior Publication Data
US 2019/0225751 A1 Jul. 25, 2019

(30) Foreign Application Priority Data
Jan. 23, 2018 (KR) .................. 10-2018-0008281

(51) Int. Cl.
 *C08G 73/02* (2006.01)
 *A01N 25/34* (2006.01)
 (Continued)

(52) U.S. Cl.
 CPC ......... *C08G 73/0266* (2013.01); *A01N 25/34* (2013.01); *A01N 33/12* (2013.01);
 (Continued)

(58) Field of Classification Search
 CPC ............................. A01N 25/10; H01B 1/128
 See application file for complete search history.

(56) References Cited

U.S. PATENT DOCUMENTS

| | | | | |
|---|---|---|---|---|
| 2003/0091845 A1* | 5/2003 | Pron | ................. | C08G 73/0266 428/480 |
| 2004/0254336 A1* | 12/2004 | Xiao | ........................ | C08C 2/02 528/373 |

(Continued)

FOREIGN PATENT DOCUMENTS

| | | |
|---|---|---|
| JP | 2003-183389 A | 7/2003 |
| KR | 10-2005-0046497 A | 5/2005 |

(Continued)

OTHER PUBLICATIONS

Bai et al. Preparation and characterization of polyaniline nanotubes doped with different Acid. Applied Mechanics and Materials vols. 401-403 (2013) pp. 663-666. (Year: 2013).*

(Continued)

*Primary Examiner* — Michael M Dollinger
(74) *Attorney, Agent, or Firm* — Rabin & Berdo, P.C.

(57) ABSTRACT

Disclosed is a method for preparing an insoluble polyaniline complex with antimicrobial activity and heavy metal removal efficiency that involves doping a porous nonconductive polyaniline emeraldine base with an organic acid to impart conductivity and then with a metal ion to render the metal ion attached to the surface of the conductive polymer, and a polyaniline complex prepared from the preparation method, which polyaniline complex is excellent in the ability to adsorb and/or eliminate bacteria and other microbes and to remove heavy metals and hence available in any of various applications for antimicrobial activity and heavy metal removal, including filters for water purifier, automobile or household air conditioner, gas masks, water and sewage treatment system, air purifier, cleanroom, etc.

4 Claims, 5 Drawing Sheets

(51) Int. Cl.
  *A01N 33/12* (2006.01)
  *C02F 1/28* (2006.01)
  *B01J 20/22* (2006.01)
  *B01J 20/30* (2006.01)
  *C02F 1/50* (2006.01)
  *C02F 101/20* (2006.01)

(52) U.S. Cl.
  CPC ......... *B01J 20/223* (2013.01); *B01J 20/3085* (2013.01); *C02F 1/285* (2013.01); *C02F 1/505* (2013.01); *C02F 2101/20* (2013.01); *C02F 2303/04* (2013.01); *C08G 2340/00* (2013.01)

(56) References Cited

U.S. PATENT DOCUMENTS

| | | | |
|---|---|---|---|
| 2008/0171656 A1* | 7/2008 | Wang | B01J 23/42 502/326 |
| 2010/0033160 A1* | 2/2010 | Kocherginsky | G01N 27/4168 324/72 |
| 2011/0101282 A1* | 5/2011 | Hua | C08L 79/02 252/500 |
| 2017/0184535 A1* | 6/2017 | Holliday | C07D 409/14 |
| 2019/0225751 A1* | 7/2019 | Yoon | C08G 73/0266 |

FOREIGN PATENT DOCUMENTS

| | | |
|---|---|---|
| KR | 10-2008-0110150 A | 12/2008 |
| KR | 10-1623195 B1 | 5/2016 |
| KR | 10-2012-0100079 A | 8/2017 |
| KR | 10-2017-0092343 A | 8/2017 |

OTHER PUBLICATIONS

Yusuf et al. Synthesis of modified conducting polymers and study of their water purification capability. Dhaka University Journal of Science, vol. 57, Issue: 2, pp. 229-233, Journal, 2009. (Year: 2009).*

Huang et al. Polyaniline Nanofibers: Facile Synthesis and Chemical Sensors. J. Am. Chem. Soc. 2003, 125, 314-315. (Year: 2003).*

Huang 2. Syntheses and applications of conducting polymer polyaniline nanofibers. Pure Appl. Chem., vol. 78, No. 1, pp. 15-27, 2006. (Year: 2006).*

Jiaxing Huang et al., "Polyaniline Nanofibers: Facile Synthesis and Chemical Sensors", J. Am. Chem. Soc., 2003, vol. 125, No. 2, pp. 314-315.

[A. A. Isakova et al., "The influence of the surface structure of polyaniline films on the adsorption of influenza A viruses and antibodies to them", Protection of metals and physical chemistry of surfaces, Jul. 29, 2016, vol. 52, No. 4, pp. 677-683.

Jiaxing Huang, "Syntheses and applications of conducting polymer polyaniline nanofibers", Pure Appl. Chem., 2006, pp. 15-27, vol. 78, No. 1.

Selcuk Poyraz et al., "One-Step Synthesis and Characterization of Polyaniline Nanofiber/Silver Nanoparticle Composite Networks as Antibacterial Agents", ACE Applied Materials & Interfaces, Nov. 3, 2014, vol. 3, No. 22, pp. 20025-20034.

* cited by examiner

METHOD FOR PREPARING POLYANILINE COMPLEX WITH ANTIMICROBIAL ACTIVITY AND HEAVY METAL REMOVAL EFFICIENCY USING CONDUCTIVE POLY ANILINE POLYMER DOPED WITH ORGANIC ACID AND METAL ION IN DEFINED ORDER

CROSS-REFERENCE TO RELATED APPLICATIONS

This U.S. non-provisional patent application claims priority under 35 U.S.C. § 119 of Korean Patent Applications No. 10-2018-0008281, filed on Jan. 23, 2018, the entire content of which is hereby incorporated by reference.

BACKGROUND OF THE INVENTION

The present invention relates to a method for preparing a polyaniline complex with antimicrobial activity and heavy metal removal efficiency using a conductive polyaniline polymer doped with an organic acid and a metal ion in a defined order, and a polyaniline complex prepared from the preparation method. In particular, the present invention relates to a method for preparing an insoluble polyaniline complex with antimicrobial activity and heavy metal removal efficiency that involves doping a porous nonconductive polyaniline emeraldine base with an organic acid to impart conductivity and then with a metal ion to render the metal ion attached to the surface of the conductive polymer, and a polyaniline complex prepared from the preparation method.

Conventionally, water purifiers, water and sewage treatment systems, air purifiers, cleanrooms, or the like are equipped with antimicrobial filters having an ability to remove bacteria and other microbes, and those filters are supposed to include an antimicrobial material capable of removing any of various viruses (microbes) or contaminants like proteins by adsorption. Such an antimicrobial filter material as currently available is generally prepared using a metal powder material, such as silver, copper, gold, zinc, alumina, or titanium dioxide, in the form of an aqueous solution dispersed and adhered on a porous material. The porous material available may be made of any of various porous resins, including active carbon, silica gel, polyurethane, zeolite, active carbon, charcoal, phenol resin, etc. The porous material like active carbon or silica gel as used in the conventional antimicrobial filters has such a small pore size that the pores are likely to clog with the adsorbed contaminants, which eventually deteriorates the antimicrobial performance over time. A solution to this problem is disclosed in KR Patent Laid-Open Publication No. 2005-0046497 that describes an antimicrobial filter using an antimicrobial metal or metal salt adsorbed by a carbon ball consisting of a hollow core portion and a porous carbon cell portion. But, the metal or metal salt used in the antimicrobial filter is merely adsorbed by the porous active carbon substrate, so it is subject to elution due to an environmental change like external moisture or heat and likely to cause an abrupt degradation of the antimicrobial efficiency when adsorbing a defined amount of contaminants.

REFERENCES CITED (Patent Document 0001) KR Patent Laid-Open Publication No. 10-2012-0100079 (laid open on Sep. 12, 2009)

(Patent Document 0002) Korean Patent No. 1623195 (published on May 20, 2016)

(Patent Document 0003) KR Patent Laid-Open Publication No. 10-2017-0092343 (laid open on Aug. 11, 2017)

BRIEF SUMMARY OF THE INVENTION

It is therefore an object of the present invention to provide a method for preparing an insoluble polyaniline complex with antimicrobial activity and heavy metal removal efficiency, and a polyaniline complex prepared from the preparation method for the purpose of solving the above-mentioned problems with the conventional antimicrobial filter materials, where the preparation method involves doping a porous nonconductive polyaniline emeraldine base with an organic acid to impart conductivity and then with a metal ion to render the metal ion attached to the surface of the conductive polymer, so the resultant polyaniline complex is not only available for air filters with high adsorption and removal efficiency for bacteria and other microbes but also capable of adsorbing any of various heavy metals contained in water.

To achieve the object of the present invention, there is provided a method for preparing a polyaniline complex for antimicrobial activity and heavy metal removal efficiency, and a polyaniline complex prepared from the method, where the preparation method includes: (a) synthesizing a polyaniline emeraldine base in the form of a nano-fiber using a conventional interfacial polymerization; (b) doping the polyaniline emeraldine base of the step (a) with an organic acid to prepare a polyaniline emeraldine salt complex; and (c) doping the polyaniline emeraldine salt complex of the step (b) with a metal ion or a metal salt to prepare an insoluble polyaniline/metal complex.

Hereinafter, the present invention will be described in detail.

The basic conductive polyaniline polymer used in the polyaniline complex for antimicrobial activity and heavy metal removal efficiency according to the present invention has a nano-fiber structure, which is a porous microstructure capable of easily adsorbing bacteria and other microbes. A known synthesis method for a polyaniline with such a microscopic structure involves preparing a system with an organic phase and an aqueous phase that are immiscible, dissolving an aniline monomer in the organic phase and an initiator and an organic acid in the aqueous phase, and then activating an interfacial polymerization to prepare a polyaniline polymer in the nano-fiber form (Huang et al., J. Am. Chem. Soc. 125, 314 (2003)).

On the other hand, the basic conductive polyaniline polymer has a basic amine structure in the monomolecular chain, so it can easily adsorb heavy metals due to the strong interactions with heavy metal ions. Doping with any one of various organic acids through an acid-base reaction may impart conductivity to the nonconductive polyaniline emeraldine base. The polyaniline emeraldine base rendered conductive in this molecular state is called "salt", which is subject to interaction with the protein molecules contained in the bacteria and other microbes and consequently to adsorption on the surface of the polymer (Isakova et al., "Protection of metals and physical chemistry of surfaces" Vol. 52, No. 4, 2016). The organic acid as used in this related art is typically a sulfonic acid derivative having a high acidity, such as camphorsulfonic acid, for the sake of enhancing electrical conductivity. But, the organic acid used as a dopant in the present invention is preferably carboxylic acids, for carboxylic acid derivatives with a low acidity are more acceptable than the derivatives having sulfonyl groups in terms of harmfulness and toxicity. Among the organic acids having carboxyl groups, ethylenediaminetetraacetic acid (EDTA) that contains two amine groups and four carboxyl groups is a well-known substance whose molecules can form a chelate compound through a strong interaction with any of various heavy metals. Accordingly, the present invention involves doping the basic conductive polyaniline polymer with ethylenediaminetetraacetic acid (EDTA). In this regard, some of the four carboxyl groups participate in the formation of bonds with the basic conductive polyaniline polymer to create a insoluble polyaniline emeraldine salt complex, while the other carboxyl groups and the amine groups are still available to form a chelate compound with various heavy metals.

The carboxylic acid derivative as used in the present invention is not specifically limited to ethylenediaminetetraacetic acid (EDTA) but may also include glutaric acid having two carboxyl groups and acetic acid having a carboxyl group that can form an insoluble polyaniline salt complex Although the antimicrobial and sterilization mechanisms of silver (Ag) as a natural antimicrobial agent are not yet identified, it is known from a number of experiments and cases that silver (Ag) forms a strong bond with —SH, —CO$_2$H, or —OH in microbes to destroy the cell membranes of bacteria or disturb the cellular functions. Presumably, antimicrobial metal ions (Ag$^+$, Zn$^{2+}$, Cu$^{2+}$, etc.) released from the inorganic carriers used in the antimicrobial agents combine with the proteins of cell membranes or enzymes to inhibit the energy metabolism of the cells. The metal ion used in the inorganic carrier is called "antimicrobial metal". In order to maximize the antimicrobial function to kill bacteria or other microbes, the polyaniline emeraldine salt complex prepared by doping a polyaniline emeraldine base with an organic acid, such as EDTA, glutaric acid, or acetic acid, is further doped with an antimicrobial metal so that the metal ion is adsorbed by the polyaniline emeraldine salt complex to impart the function of the antimicrobial metal to kill microbes to the basic conductive polyaniline polymer in addition to the inherent ability of the basic conductive polyaniline polymer to absorb bacteria or other microbes.

Particularly, out of the antimicrobial metal ions available in the present invention, silver (Ag) is reduced to silver (Ag) nanoparticles through the reaction with the polyaniline emeraldine salt and forms a polyaniline emeraldine salt complex from a basic conductive polyaniline polymer. In this manner, silver (Ag) in the form of solid nanoparticles other than ions may form a complex insoluble to any of various solvents to offer a lasting antimicrobial function and thus to maintain a long-tem antimicrobial function.

Hereinafter, a description will be given as to a method for preparing a polyaniline complex for antimicrobial activity and heavy metal removal efficiency according to the present invention as follows.

Synthesis of Polyaniline Emeraldine Base

Firstly, a conventional interfacial polymerization method is used to synthesize a nano-sized, porous polyaniline emeraldine base as represented by the following chemical formula I.

In the polyaniline complex for antimicrobial activity and heavy metal removal efficiency according to the present invention, the porous nano-fiber obtained by interfacial polymerization preferably has a diameter of 10 to 500 nm, with the inter-nanofiber pores 1 to 50 nm in diameter, in order to maximize the surface area of the basic conductive polyaniline polymer.

[Chemical Formula 1]

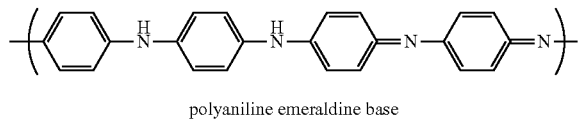

polyaniline emeraldine base

Preparation of Polyaniline Emeraldine Salt Complex

The polyaniline emeraldine base is doped with an organic acid, ethylenediaminetetraacetic acid (EDTA), in the aqueous phase. For example, the EDTA molecules are dissolved in water and then reacted with the polyaniline emeraldine base for one hour using an ultrasound washing machine to prepare an EDTA-bonded polyaniline emeraldine salt complex as represented by the following chemical formula 2.

Any conductive polymer complex represented by the following chemical formula 2 may be used in the polyaniline complex for antimicrobial activity and heavy metal removal efficiency according to the present invention. In the chemical formula 2, the organic acid used as a dopant includes at least one of ethylenediaminetetraacetic acid (EDTA), glutaric acid, and acetic acid, which may be used alone or in combination in a polyaniline emeraldine salt complex doped with a single organic acid or at least two organic acids. Accordingly, the polyaniline complex for antimicrobial activity and heavy metal removal efficiency according to the present invention may be prepared in any of various compositions according to its use purposes including antimicrobial activity and heavy metal removal.

The organic acid is preferably contained in an amount of 20 to 50 wt. % with respect to the total weight of the conductive polyaniline polymer. The content of the organic acid less than 20 wt. % leads to a degradation in the antimicrobial activity and heavy metal removal efficiency of the polyaniline complex of the present invention; and the content of the organic acid greater than 50 wt. % causes an elution of the organic acid used as a dopant.

[Chemical Formula 2]

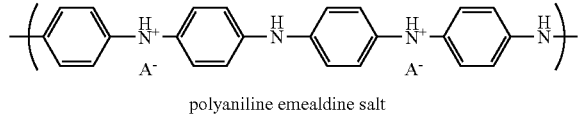

polyaniline emealdine salt
A = EDTA, Glutaric acid, Acetic acid, Camphor sulfonic acid, Dodecylbenzene sulfonic acid In the chemical formula 2, A independently denotes an organic acid used as a dopant.

Preparation of Polyaniline/Metal Complex

The polyaniline emeraldine salt complex thus obtained is added to an aqueous solution of silver nitrate (AgNO$_3$) to cause a reduction reaction of Ag ions on the surface of the polyaniline polymer through a 12-hour reaction. As can be observed through an electron microscope, silver (Ag) nanoparticles are uniformly attached on the surface of the polyaniline polymer. The polyaniline/metal complex is represented by the following chemical formula 3.

Any conductive polyaniline/metal complex represented by the following chemical formula 3 may be used in the polyaniline complex for antimicrobial activity and heavy metal removal efficiency according to the present invention. In the chemical formula 3, the antimicrobial metal or metal salt includes at least one of silver, copper, zinc, and alumina, which may be used alone or in combination in a polyaniline/metal complex doped with a single metal ion or at least two metal ions. Accordingly, the polyaniline complex for antimicrobial activity and heavy metal removal efficiency according to the present invention may be prepared in any of various compositions according to its use purposes, including antimicrobial activity and heavy metal removal.

The metal ion or metal salt is preferably contained in an amount of 5 to 30 wt. % with respect to the total weight of the conductive polyaniline polymer. The content of the metal ion or metal salt less than 5 wt. % leads to a degradation in the antimicrobial activity and heavy metal removal efficiency of the polyaniline complex of the present invention; and the content of the metal ion or metal salt greater than 30 wt. % causes an elution of the metal substance used as a dopant.

[Chemical Formula 3]

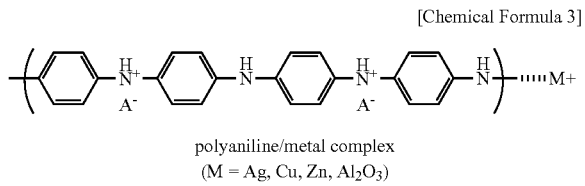

polyaniline/metal complex
(M = Ag, Cu, Zn, Al$_2$O$_3$)

In the chemical formula 3, M independently denotes a metal ion, and ■■■■ indicates a connection between the polyaniline emeraldine salt and the metal ion (M+) of a metal-complex type.

The polyaniline complex for antimicrobial activity and heavy metal removal efficiency according to the present invention is excellent in the ability to adsorb and/or eliminate bacteria and other microbes and to remove heavy metals and hence available in any of various applications for antimicrobial activity and heavy metal removal, including filters for water purifier, automobile or household air conditioner, gas mask, water and sewage treatment system, air purifier, cleanroom, etc.

DETAILED DESCRIPTION OF THE INVENTION

Hereinafter, a detailed description will be given as to the present invention through the following examples, which are not construed to define the scope of the present invention but obviously many modifications and variations are possible in the light of the teaching of the present invention.

Example 1

Preparation of Polyaniline Complex for Antimicrobial Activity and Heavy Metal Removal Efficiency According to Present Invention A description as to the method for preparing a polyaniline complex for antimicrobial activity and heavy metal removal efficiency according to the present invention is given as follows.

(1) Synthesis of Polyaniline Emeraldine Base in Nano-Fiber Form 96 g of aniline was added to 500 ml of chloroform, and 2 L of a 3M aqueous solution of HCl was slowly added over one hour under agitation. The temperature of the reaction bath was maintained at −28° C. with a condenser. 10 g of lithium chloride (LiCl) was added to prevent the solution of the reaction bath from freezing at lower temperature. 57 g of ammonium persulfate used as a radical polymerization initiator was dissolved in 200 ml of water, and the solution was then added dropwise over 2 hours. A 12-hour reaction resulted in producing a polyaniline emeraldine salt doped with hydrochloric acid (HCl). The salt thus obtained was filtered through a filter paper and then treated with ammonia water to prepare 25 g of an HCl-undoped polyaniline emeraldine base in the nano-fiber form. The polyaniline emeraldine base thus obtained was observed with a scanning electron microscope.

Figure 1:
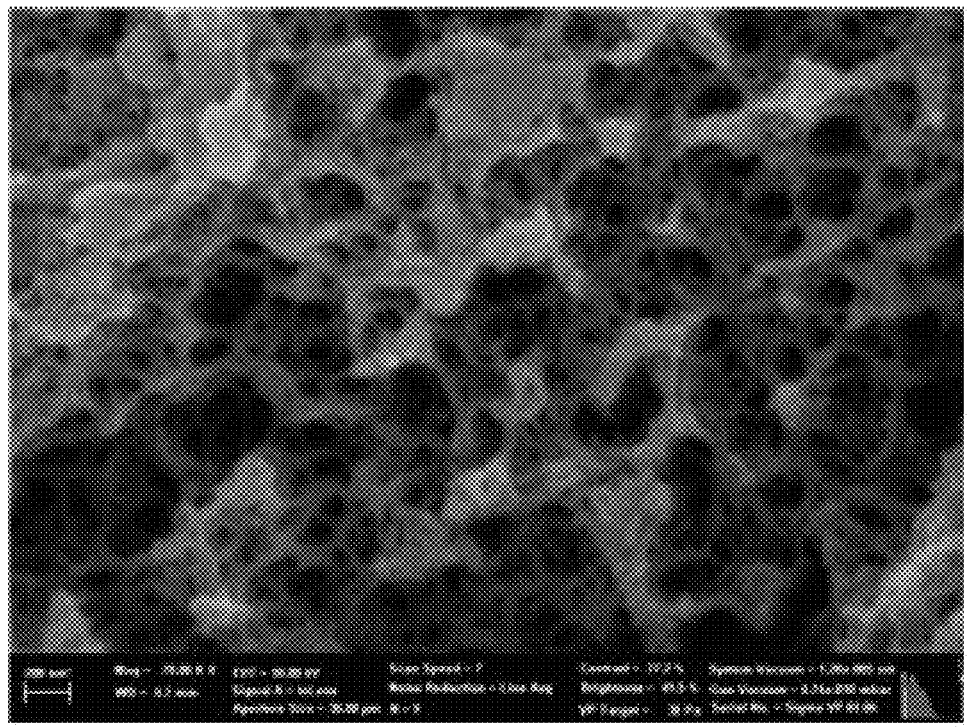
FIG. 1 is an electron micrograph showing that the polyaniline emeraldine base of the present invention has the nano-fiber form with numerous pores.

The results are presented in FIG. 1.

As can be seen from FIG. 1, the polyaniline emeraldine base of the present invention had the nano-fiber form with numerous pores.

(2) Preparation of Polyaniline Emeraldine Salt Complex

To dope the synthesized polyaniline emeraldine base with an organic acid, 1 g of ethylenediaminetetraacetic acid (EDTA) was dissolved in 2 L of water, and 2 g of the polyaniline emeraldine base was treated with the aqueous solution of EDTA using an ultrasonic washing machine for one hour. A 12-hour agitation with an agitator ended up producing 2.5 g of an EDTA-doped polyaniline emeraldine salt complex.

The polyaniline emeraldine salt complex thus obtained was filtered through a filter paper, washed with distilled water multiple times to remove the unreacted EDTA molecules, and then dried out. The dried polyaniline emeraldine salt complex was photographed with a scanning electron microscope.

Figure 2:
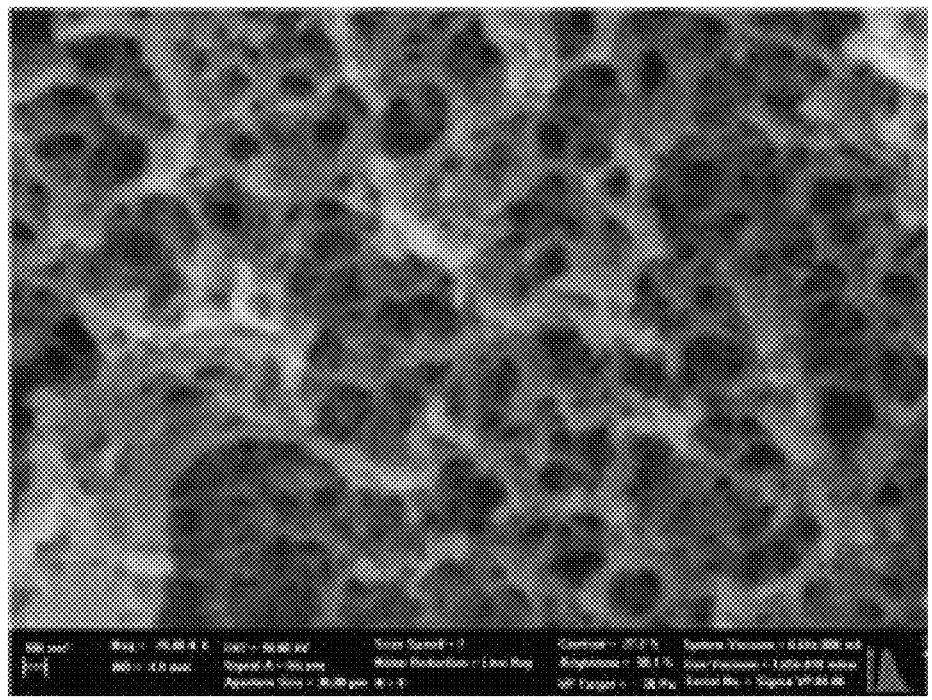
FIG. 2 is an electron micrograph showing that the polyaniline emeraldine salt complex prepared by doping the polyaniline emeraldine base with EDTA as an organic acid has a nano-fiber structure with numerous pores.

The results are presented in FIG. 2.

As can be seen from FIG. 2, the polyaniline emeraldine salt complex maintained its structure comprised of nano-fibers with numerous pores even though it was doped with an organic acid, EDTA.

(3) Preparation of Polyaniline/Metal Complex

To dope the EDTA-doped polyaniline emeraldine salt complex with an antimicrobial metal ion, 5 g of the EDTA-doped polyaniline emeraldine salt complex was soaked with 1 L of a 5% aqueous solution of silver nitrate (AgNO$_3$) and aged for 2 days to cause a gradual reduction reaction of silver (Ag) ions sticking to the surface of the polymer into silver (Ag) nanoparticles, resulting in producing 5.4 g of an insoluble polyaniline/metal complex with silver nanoparticles on the surface. The polyaniline/metal complex thus obtained was washed with distilled water multiple times to remove the unreacted silver nitrate portion and then dried out. The dried polyaniline/metal complex was photographed with a scanning electron microscope.

Figure 3:
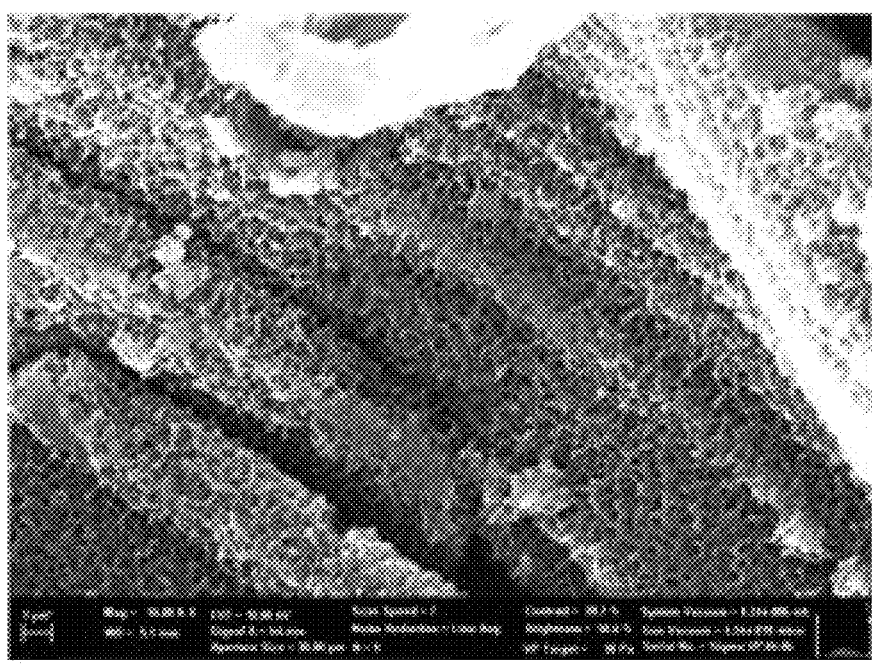
FIG. 3 is an electron micrograph showing that silver (Ag) nanoparticles are produced and adsorbed on the surface of the polyaniline/metal complex in the polyaniline emeraldine salt complex doped with an organic acid, EDTA.

The results are presented in FIG. 3.

As can be seen from FIG. 3, nano-sized silver (Ag) particles were uniformly created and attached on the surface of the insoluble polyaniline/metal complex.

Comparative Example 1

Preparation of Polyaniline Complex Doped with Metal Ion and then with Organic Acid The procedures were performed to prepare a polyaniline complex for antimicrobial activity and heavy metal removal efficiency in the same manner as described in Example 1, excepting that a polyaniline emeraldine base was doped with silver nitrate ($AgNO_3$) as an antimicrobial metal ion to prepare a polyaniline/metal complex and then with ethylenediaminetetraacetic acid (EDTA) as an organic acid to prepare a polyaniline emeraldine salt complex, while in Example 1, a polyaniline emeraldine base was doped with EDTA as an organic acid to prepare a polyaniline emeraldine salt complex and then with silver nitrate ($AgNO_3$) as an antimicrobial metal ion to prepare a polyaniline/metal complex.

Hereinafter, a detailed description will be given as follows.

(1) Synthesis of Polyaniline Emeraldine Base 96 g of aniline was added to 500 ml of chloroform, and 2 L of a 3M aqueous solution of HCl was slowly added over one hour under agitation. The temperature of the reaction bath was maintained at −28° C. with a condenser. 10 g of lithium chloride (LiCl) was added to prevent the solution of the reaction bath from freezing at lower temperature. 57 g of ammonium persulfate used as a radical polymerization initiator was dissolved in 200 ml of water, and the solution was then added dropwise over 2 hours. A 12-hour reaction resulted in producing a polyaniline emeraldine salt doped with hydrochloric acid (HCl). The salt thus obtained was filtered through a filter paper and then treated with ammonia water to prepare 25 g of an HCl-undoped polyaniline emeraldine base in the nano-fiber form.

(2) Preparation of Polyaniline/Metal Complex

To dope the synthesized polyaniline emeraldine base with an antimicrobial metal ion, 5 g of the polyaniline emeraldine base was soaked with 1 L of a 5% aqueous solution of silver nitrate ($AgNO_3$) and aged for 2 days to cause a gradual reduction reaction of silver (Ag) ions sticking to the surface of the polymer into silver (Ag) nanoparticles, resulting in producing 5.4 g of an insoluble polyaniline/metal complex with silver nanoparticles on the surface. The polyaniline/metal complex thus obtained was washed with distilled water multiple times to remove the unreacted silver nitrate portion and then dried out.

(3) Preparation of Polyaniline Emeraldine Salt Complex

To dope the metal-ion-doped polyaniline/metal complex with an organic acid, 1 g of ethylenediaminetetraacetic acid (EDTA) was dissolved in 2 L of water, and 2 g of the polyaniline/metal complex was treated with the aqueous solution of EDTA using an ultrasonic washing machine for one hour. A 12-hour agitation with an agitator ended up producing 2.5 g of an EDTA-doped polyaniline emeraldine salt complex.

The polyaniline emeraldine salt complex thus obtained was filtered through a filter paper, washed with distilled water multiple times to remove the unreacted EDTA molecules, and then dried out.

Comparative Example 2

Preparation of Polyaniline Complex Using Organic Acid as Sole Dopant (1) Synthesis of Polyaniline Emeraldine Base 96 g of aniline was added to 500 ml of chloroform, and 2 L of a 3M aqueous solution of HCl was slowly added over one hour under agitation. The temperature of the reaction bath was maintained at −28° C. with a condenser. 10 g of lithium chloride (LiCl) was added to prevent the solution of the reaction bath from freezing at lower temperature. 57 g of ammonium persulfate used as a radical polymerization initiator was dissolved in 200 ml of water, and the solution was then added dropwise over 2 hours. A 12-hour reaction resulted in producing a polyaniline emeraldine salt doped with hydrochloric acid (HCl). The salt thus obtained was filtered through a filter paper and then treated with ammonia water to prepare 25 g of an HCl-undoped polyaniline emeraldine base in the nano-fiber form.

(2) Preparation of Polyaniline Emeraldine Salt Complex

To dope the synthesized polyaniline emeraldine base with an organic acid, 1 g of ethylenediaminetetraacetic acid (EDTA) was dissolved in 2 L of water, and 2 g of the polyaniline emeraldine base was treated with the aqueous solution of EDTA using an ultrasonic washing machine for one hour. A 12-hour agitation with an agitator ended up producing 2.5 g of an EDTA-doped polyaniline emeraldine salt complex.

The polyaniline emeraldine salt complex thus obtained was filtered through a filter paper, washed with distilled water multiple times to remove the unreacted EDTA molecules, and then dried out.

Comparative Example 3

Preparation of Polyaniline Complex Doped Using Metal Ion as Sole Dopant (1) Synthesis of Polyaniline Emeraldine Base 96 g of aniline was added to 500 ml of chloroform, and 2 L of a 3M aqueous solution of HCl was slowly added over one hour under agitation. The temperature of the reaction bath was maintained at −28° C. with a condenser. 10 g of lithium chloride (LiCl) was added to prevent the solution of the reaction bath from freezing at lower temperature. 57 g of ammonium persulfate used as a radical polymerization initiator was dissolved in 200 ml of water, and the solution was then added dropwise over 2 hours. A 12-hour reaction resulted in producing a polyaniline emeraldine salt doped with hydrochloric acid (HCl). The salt thus obtained was filtered through a filter paper and then treated with ammonia water to prepare 25 g of an HCl-undoped polyaniline emeraldine base in the nano-fiber form.

(2) Preparation of Polyaniline/Metal Complex

To dope the synthesized polyaniline emeraldine base with an antimicrobial metal ion, 5 g of the polyaniline emeraldine base was soaked with 1 L of a 5% aqueous solution of silver nitrate ($AgNO_3$) and aged for 2 days to cause a gradual reduction reaction of silver (Ag) ions sticking to the surface of the polymer into silver (Ag) nanoparticles, resulting in producing 5.4 g of an insoluble polyaniline/metal complex with silver nanoparticles on the surface. The polyaniline/ metal complex thus obtained was washed with distilled water multiple times to remove the unreacted silver nitrate portion and then dried out.

Experimental Example 1

Antimicrobial Activity Testing when Using Organic Acid and Metal Ion as Dopants in Different Doping Orders 2 g of the polyaniline complex for antimicrobial activity and heavy metal removal efficiency according to the present invention in Example 1 was filled in a 16×12 urethane hose to prepare a specimen filter for water purifier.

To prepare a control filter, the procedures were performed in the same manner as described above, excepting that the polyaniline complex of Comparative Example 1 was used.

1-1. Virus Removal Testing

The virus as used herein was MS2 virus, and the virus removal efficiency was evaluated according to the VF international standards.

More specifically, MS2 virus was added to water in an amount of 1 ml per 5 L of water to prepare an aqueous solution, which was then passed through a filter for water purifier under the pressure of 1 kg at a rate of 60 ml/min. 500 ml of the aqueous solution obtained as a filtrate was subjected to a virus removal testing.

The testing results are presented in Table 1 and FIG. 4.

Figure 4A:
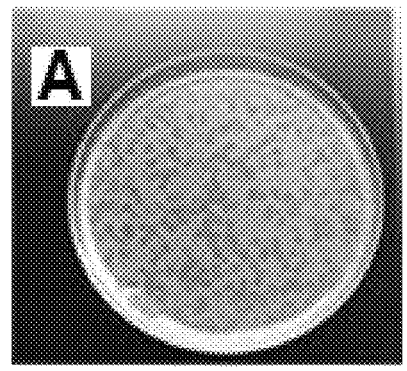
FIG. 4A, FIG. 4B and FIG. 4C are images showing the virus removal activity of the polyaniline complex for antimicrobial activity and heavy metal removal efficiency according to the present invention.
Figure 4B:
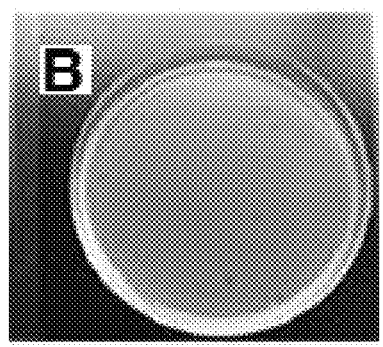
Figure 4C:
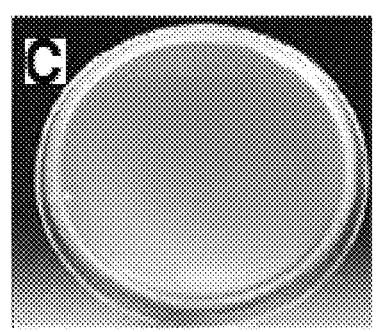

In FIG. 4A, the image (A) shows a log reduction of MS2 virus counts from a 6 input log to a less than 4 output log in the virus removal testing; in FIG. 4B, the image (B) shows a 5 log reduction of the input virus; and in FIG. 4C, the image (C) shows a 6 log reduction.

As can be seen from Table 1 and FIG. 4, the polyaniline complex for antimicrobial activity and heavy metal removal efficiency according to the present invention in Example 1 had a 6.1 input log of the virus on the first day and a 5.7 log reduction of the input virus on the fourth day, showing that more than 90% of the input virus was consistently removed.

On the other hand, the polyaniline complex of Comparative Example 1 as prepared using a metal ion and then an organic acid as dopants in a different doping order from Example 1 had a 6.3 input log of the virus on the first day and a 2.3 log reduction of the input virus on the fourth day, showing that no more than about 30% of the input virus was removed.

In conclusion, the polyaniline complex prepared by doping with an organic acid and then with a metal ion according to the present invention was superior in the virus removal efficiency to the polyaniline complex prepared by doping with a metal ion and then with an organic acid according to Comparative Example 1.

TABLE 1

| Div. | | Virus pfu/ml | Input | Input log | Output log | Log reduction |
|---|---|---|---|---|---|---|
| Example 1 | 1$^{st}$ day | 1.9 × 10$^6$ | | 6.1 | 0.0 | 6.1 |
| | 4$^{th}$ day | 1.9 × 10$^6$ | | 6.1 | 0.4 | 5.7 |
| Comparative | 1$^{st}$ day | 1.9 × 10$^6$ | | 6.3 | 0.0 | 6.3 |
| Example 1 | 4$^{th}$ day | 1.9 × 10$^6$ | | 6.3 | 4.0 | 2.3 |

1-2. Bacteria Removal Testing

The bacterium as used herein was *E. coli*, and the bacteria removal efficiency was evaluated according to the VF international standards.

More specifically, *E. coli* was added to water in an amount of 1 ml per 3 L of water to prepare an aqueous solution, which was then passed through a filter for water purifier under the pressure of 1 kg at a rate of 60 ml/min. 500 ml of the aqueous solution obtained as a filtrate was subjected to a bacteria removal testing.

The testing results are presented in Table 2 and FIG. 5.

Figure 5A:
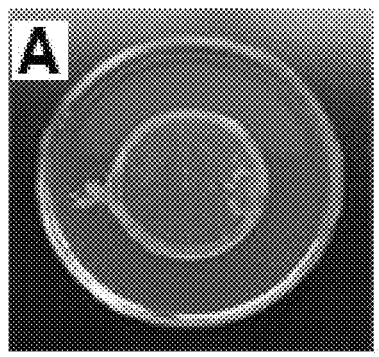
FIG. 5A, FIG. 5B and FIG. 5C are images showing the bacteria removal activity of the polyaniline complex for antimicrobial activity and heavy metal removal efficiency according to the present invention.
Figure 5B:
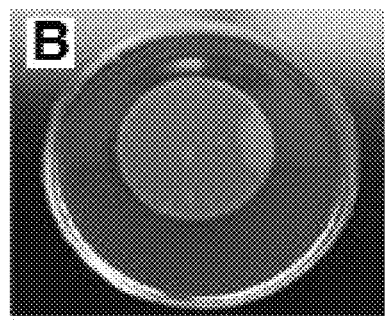
Figure 5C:
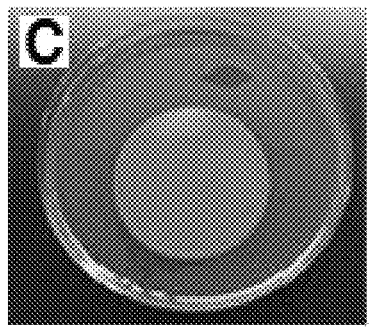

In FIG. 5A, the image (A) shows a log reduction of *E. coli* counts from an 8 input log to a less than 6 output log in the bacteria removal testing; in FIG. 5B, the image (B) shows a 6-8 log reduction of *E. coli*; in FIG. 5C, and the image (C) shows an 8 log reduction of *E. coli*.

As can be seen from Table 2 and FIG. 5, the polyaniline complex for antimicrobial activity and heavy metal removal efficiency according to the present invention in Example 1 had an 8.0 input log of *E. coli* on the first day and an about 7.2 log reduction of *E. coli* on the fourth day, showing that more than 90% of the bacteria was consistently removed.

On the other hand, the polyaniline complex of Comparative Example 1 as prepared in a different doping order with a metal ion and an organic acid had an 8.3 input log of *E. coli* on the first day and a 4.0 log reduction of *E. coli* on the fourth day, showing that no more than about 50% of the bacteria was removed.

In conclusion, the polyaniline complex prepared by doping with an organic acid and then with a metal ion according to the present invention was superior in the bacteria removal efficiency to the polyaniline complex prepared by doping with a metal ion and then with an organic acid according to Comparative Example 1.

TABLE 2

| Div. | | Bacteria pfu/ml | Input | Input log | Output log | Log reduction |
|---|---|---|---|---|---|---|
| Example 1 | 1$^{st}$ day | 1.9 × 10$^6$ | | 8.0 | 0.0 | 8.0 |
| | 4$^{th}$ day | 1.9 × 10$^6$ | | 8.0 | 0.8 | 7.2 |
| Comparative | 1$^{st}$ day | 1.9 × 10$^6$ | | 8.3 | 0.0 | 8.3 |
| Example 1 | 4$^{th}$ day | 1.9 × 10$^6$ | | 8.3 | 4.3 | 4.0 |

Experimental Example 2

Antimicrobial Activity Testing when Using Organic Acid as Sole Dopant 2 g of the polyaniline complex for antimicrobial activity and heavy metal removal efficiency according to the present invention in Example 1 was filled in a 16×12 urethane hose to prepare a specimen filter for water purifier.

To prepare a control filter, the procedures were performed in the same manner as described above, excepting that the polyaniline complex of Comparative Example 2 was used.

2-1. Virus Removal Testing

The virus as used herein was MS2 virus, and the virus removal efficiency was evaluated according to the VF international standards.

More specifically, MS2 virus was added to water in an amount of 1 ml per 5 L of water to prepare an aqueous solution, which was then passed through a filter for water purifier under the pressure of 1 kg at a rate of 60 ml/min. 500 ml of the aqueous solution obtained as a filtrate was subjected to a virus removal testing.

The testing results are presented in Table 3.

As can be seen from Table 3, the polyaniline complex for antimicrobial activity and heavy metal removal efficiency according to the present invention in Example 1 had a 6.1 input log of the virus on the first day and a 5.7 log reduction of the input virus on the fourth day, showing that more than 90% of the input virus was consistently removed.

On the other hand, the polyaniline complex of Comparative Example 2 as prepared using an organic acid as a sole dopant had a 6.0 input log of the virus on the first day and a 3.1 log reduction of the input virus on the fourth day, showing that no more than about 50% of the input virus was removed.

In conclusion, the polyaniline complex prepared by doping with an organic acid and then with a metal ion according to the present invention was far superior in the virus removal efficiency to the polyaniline complex prepared by doping with an organic acid solely according to Comparative Example 2.

TABLE 3

| Div. | Virus pfu/ml | Input | Input log | Output log | Log reduction |
|---|---|---|---|---|---|
| Example 1 | $1^{st}$ day | $1.9 \times 10^6$ | 6.1 | 0.0 | 6.1 |
|  | $4^{th}$ day | $1.9 \times 10^6$ | 6.1 | 0.4 | 5.7 |
| Comparative Example 2 | $1^{st}$ day | $1.9 \times 10^6$ | 6.0 | 0.0 | 6.1 |
|  | $4^{th}$ day | $1.9 \times 10^6$ | 6.0 | 2.9 | 3.1 |

2-2. Bacteria Removal Testing

The bacterium as used herein was *E. coli*, and the bacteria removal efficiency was evaluated according to the VF international standards.

More specifically, *E. coli* was added to water in an amount of 1 ml per 3 L of water to prepare an aqueous solution, which was then passed through a filter for water purifier under the pressure of 1 kg at a rate of 60 ml/min. 500 ml of the aqueous solution obtained as a filtrate was subjected to a bacteria removal testing.

The testing results are presented in Table 4.

As can be seen from Table 4, the polyaniline complex for antimicrobial activity and heavy metal removal efficiency according to the present invention in Example 1 had an 8.0 input log of *E. coli* on the first day and an about 7.2 log reduction of *E. coli* on the fourth day, showing that more than 90% of the bacteria was consistently removed.

On the other hand, the polyaniline complex of Comparative Example 2 as prepared using an organic acid as a sole dopant had an 8.0 input log of *E. coli* on the first day and a 5.1 log reduction of *E. coli* on the fourth day, showing that about 60% of the bacteria was removed.

In conclusion, the polyaniline complex prepared by doping with an organic acid and then with a metal ion according to the present invention was far superior in the bacteria removal efficiency to the polyaniline complex prepared by doping with an organic acid solely according to Comparative Example 2.

TABLE 4

| Div. | Bacteria pfu/ml | Input | Input log | Output log | Log reduction |
|---|---|---|---|---|---|
| Example 1 | $1^{st}$ day | $1.9 \times 10^6$ | 8.0 | 0.0 | 8.0 |
|  | $4^{th}$ day | $1.9 \times 10^6$ | 8.0 | 0.8 | 7.2 |
| Comparative Example 2 | $1^{st}$ day | $1.9 \times 10^6$ | 8.0 | 0.0 | 8.3 |
|  | $4^{th}$ day | $1.9 \times 10^6$ | 8.0 | 2.9 | 5.1 |

Experimental Example 3

Antimicrobial Activity Testing when Using Metal Ion as Sole Dopant 2 g of the polyaniline complex for antimicrobial activity and heavy metal removal efficiency according to the present invention in Example 1 was filled in a 16×12 urethane hose to prepare a specimen filter for water purifier.

To prepare a control filter, the procedures were performed in the same manner as described above, excepting that the polyaniline complex of Comparative Example 3 was used.

3-1. Virus Removal Testing

The virus as used herein was MS2 virus, and the virus removal efficiency was evaluated according to the VF international standards.

More specifically, MS2 virus was added to water in an amount of 1 ml per 5 L of water to prepare an aqueous solution, which was then passed through a filter for water purifier under the pressure of 1 kg at a rate of 60 ml/min. 500 ml of the aqueous solution obtained as a filtrate was subjected to a virus removal testing.

The testing results are presented in Table 5.

As can be seen from Table 5, the polyaniline complex for antimicrobial activity and heavy metal removal efficiency according to the present invention in Example 1 had a 6.1 input log of the virus on the first day and a 5.7 log reduction of the input virus on the fourth day, showing that more than 90% of the input virus was consistently removed.

On the other hand, the polyaniline complex of Comparative Example 3 as prepared using a metal ion as a sole dopant had a 6.0 input log of the virus on the first day and a 3.8 log reduction of the input virus on the fourth day, showing that no more than about 50% of the input virus was removed.

In conclusion, the polyaniline complex prepared by doping with an organic acid and then with a metal ion according to the present invention was far superior in the virus removal efficiency to the polyaniline complex prepared by doping with a metal ion solely according to Comparative Example 3.

TABLE 5

| Div. | Virus pfu/ml | Input | Input log | Output log | Log reduction |
|---|---|---|---|---|---|
| Example 1 | $1^{st}$ day | $1.9 \times 10^6$ | 6.1 | 0.0 | 6.1 |
|  | $4^{th}$ day | $1.9 \times 10^6$ | 6.1 | 0.4 | 5.7 |
| Comparative Example 3 | $1^{st}$ day | $1.9 \times 10^6$ | 6.0 | 0.0 | 6.0 |
|  | $4^{th}$ day | $1.9 \times 10^6$ | 6.0 | 2.2 | 3.8 |

3-2. Bacteria Removal Testing

The bacterium as used herein was *E. coli*, and the bacteria removal efficiency was evaluated according to the VF international standards.

More specifically, *E. coli* was added to water in an amount of 1 ml per 3 L of water to prepare an aqueous solution, which was then passed through a filter for water purifier under the pressure of 1 kg at a rate of 60 ml/min. 500 ml of the aqueous solution obtained as a filtrate was subjected to a bacteria removal testing.

The testing results are presented in Table 6.

As can be seen from Table 6, the polyaniline complex for antimicrobial activity and heavy metal removal efficiency according to the present invention in Example 1 had an 8.0 input log of *E. coli* on the first day and an about 7.2 log reduction of *E. coli* on the fourth day, showing that more than 90% of the bacteria was consistently removed.

On the other hand, the polyaniline complex of Comparative Example 3 as prepared using a metal ion as a sole dopant had a 6.0 input log of *E. coli* on the first day and a 3.8 log reduction of *E. coli* on the fourth day, showing that about 60% of the bacteria was removed.

In conclusion, the polyaniline complex prepared by doping with an organic acid and then with a metal ion according to the present invention was far superior in the bacteria removal efficiency to the polyaniline complex prepared by doping with a metal ion solely according to Comparative Example 3.

TABLE 6

| Div. | Bacteria pfu/ml | Input | Input log | Output log | Log reduction |
|---|---|---|---|---|---|
| Example 1 | 1st day | $1.9 \times 10^6$ | 8.0 | 0.0 | 8.0 |
|  | 4th day | $1.9 \times 10^6$ | 8.0 | 0.8 | 7.2 |
| Comparative | 1st day | $1.9 \times 10^6$ | 6.0 | 0.0 | 6.0 |
| Example 3 | 4th day | $1.9 \times 10^6$ | 6.0 | 2.2 | 3.8 |

Experimental Example 4

Testing for Heavy Metal Removal when Using Organic Acid and Metal Ion as Dopants in Different Doping Orders 2 g of the polyaniline complex for antimicrobial activity and heavy metal removal efficiency according to the present invention in Example 1 was filled in a 16×12 urethane hose to prepare a specimen filter for heavy metal removal. Then, 2 L of an aqueous solution containing 1,000 ppm of heavy metal ions was passed through the filter to calculate the final TDS value with respect to the initial measurement value and determine the heavy metal removal efficiency.

The procedures were performed in the same manner as described above to prepare a control filter and carry out a testing, excepting that the polyaniline complex of Comparative Example 1 was used.

The testing results are presented in Table 7.

As can be seen from Table 7, the heavy metal removal testing showed that the polyaniline complex for antimicrobial activity and heavy metal removal efficiency according to the present invention had considerably high heavy metal removal efficiencies; 99% for nickel, 90% for lead, 91% for cadmium, 91% for zinc, 88% for copper, 88% for mercury, and 86% for chrome.

On the other hand, the polyaniline complex of Comparative Example 1 as prepared using a metal ion and then an organic acid as dopants in a different doping order from Example 1 had relatively low heavy metal removal efficiencies; 85% for nickel, 95% for lead, 90% for cadmium, 77% for zinc, 89% for copper, 93% for mercury, and 95% for chrome.

In conclusion, the polyaniline complex prepared by doping with an organic acid and then with a metal ion according to the present invention was superior in the heavy metal removal efficiency to the polyaniline complex prepared by doping with a metal ion and then with an organic acid according to Comparative Example 1.

TABLE 7

|  | Heavy metal removal efficiency (%) | |
|---|---|---|
| Heavy metal | Example 1 | Comparative Example 1 |
| Nickel | 99 | 85 |
| Lead | 90 | 95 |
| Cadmium | 91 | 90 |
| Zinc | 91 | 77 |
| Copper | 88 | 89 |
| Mercury | 88 | 93 |
| Chrome | 86 | 95 |

Experimental Example 5

Testing for Heavy Metal Removal when Using Organic Acid as Sole Dopant 2 g of the polyaniline complex for antimicrobial activity and heavy metal removal efficiency according to the present invention in Example 1 was filled in a 16×12 urethane hose to prepare a specimen filter for heavy metal removal. Then, 2 L of an aqueous solution containing 1,000 ppm of heavy metal ions was passed through the filter to calculate the final TDS value with respect to the initial measurement value and determine the heavy metal removal efficiency.

The procedures were performed in the same manner as described above to prepare a control filter and carry out a testing, excepting that the polyaniline complex of Comparative Example 2 was used.

The testing results are presented in Table 8.

As can be seen from Table 8, the heavy metal removal testing showed that the polyaniline complex for antimicrobial activity and heavy metal removal efficiency according to the present invention had considerably high heavy metal removal efficiencies; 99% for nickel, 90% for lead, 91% for cadmium, 91% for zinc, 88% for copper, 88% for mercury, and 86% for chrome.

On the other hand, the polyaniline complex of Comparative Example 2 as prepared using an organic acid as a sole dopant had relatively low heavy metal removal efficiencies; 81% for nickel, 78% for lead, 81% for cadmium, 75% for zinc, 59% for copper, 67% for mercury, and 82% for chrome.

In conclusion, the polyaniline complex prepared by doping with an organic acid and then with a metal ion according to the present invention was superior in the heavy metal removal efficiency to the polyaniline complex prepared by doping with an organic acid solely according to Comparative Example 2.

TABLE 8

|  | Heavy metal removal efficiency (%) | |
|---|---|---|
| Heavy metal | Example 1 | Comparative Example 2 |
| Nickel | 99 | 81 |
| Lead | 90 | 78 |
| Cadmium | 91 | 81 |
| Zinc | 91 | 75 |
| Copper | 88 | 59 |
| Mercury | 88 | 67 |
| Chrome | 86 | 82 |

Experimental Example 6

Testing for Heavy Metal Removal when Using Metal Ion as Sole Dopant 2 g of the polyaniline complex for antimicrobial activity and heavy metal removal efficiency according to the present invention in Example 1 was filled in a 16×12 urethane hose to prepare a specimen filter for heavy metal removal. Then, 2 L of an aqueous solution containing 1,000 ppm of heavy metal ions was passed through the filter to calculate the final TDS value with respect to the initial measurement value and determine the heavy metal removal efficiency.

The procedures were performed in the same manner as described above to prepare a control filter and carry out a testing, excepting that the polyaniline complex of Comparative Example 3 was used.

The testing results are presented in Table 9.

As can be seen from Table 9, the heavy metal removal testing showed that the polyaniline complex for antimicrobial activity and heavy metal removal efficiency according to the present invention had considerably high heavy metal removal efficiencies; 99% for nickel, 90% for lead, 91% for cadmium, 91% for zinc, 88% for copper, 88% for mercury, and 86% for chrome.

On the other hand, the polyaniline complex of Comparative Example 3 as prepared using a metal ion as a sole dopant had relatively low heavy metal removal efficiencies; 72% for nickel, 82% for lead, 78% for cadmium, 67% for zinc, 73% for copper, 72% for mercury, and 70% for chrome.

In conclusion, the polyaniline complex prepared by doping with an organic acid and then with a metal ion according to the present invention was superior in the heavy metal removal efficiency to the polyaniline complex prepared by doping with a metal ion solely according to Comparative Example 3.

TABLE 9

| Heavy metal | Heavy metal removal efficiency (%) | |
|---|---|---|
| | Example 1 | Comparative Example 3 |
| Nickel | 99 | 72 |
| Lead | 90 | 82 |
| Cadmium | 91 | 78 |
| Zinc | 91 | 67 |
| Copper | 88 | 73 |
| Mercury | 88 | 72 |
| Chrome | 86 | 70 |

What is claimed is:

1. A method for preparing a polyaniline complex for antimicrobial activity and heavy metal removal efficiency, the method comprising:
    (a) synthesizing a polyaniline emeraldine base in the form of a nano-fiber using a conventional interfacial polymerization;
    (b) doping the polyaniline emeraldine base of the step (a) with an organic acid having a carboxyl group to prepare a polyaniline emeraldine salt complex, wherein the organic acid having a carboxyl group is ethylenediaminetetraacetic acid (EDTA); and
    (c) doping the polyaniline emeraldine salt complex of the step (b) with a metal ion or a metal salt to prepare an insoluble polyaniline/metal complex.

2. The method as claimed in claim 1, wherein the organic acid of the step (b) is contained in an amount of 20 to 50 wt. % with respect to the total weight of the conductive polyaniline polymer.

3. The method as claimed in claim 1, wherein the metal ion or the metal salt of the step (c) includes silver (Ag).

4. A method for preparing a polyaniline complex for antimicrobial activity and heavy metal removal efficiency, the method comprising:
    (a) synthesizing a polyaniline emeraldine base in the form of a nano-fiber using a conventional interfacial polymerization;
    (b) doping the polyaniline emeraldine base of the step (a) with an organic acid to prepare a polyaniline emeraldine salt complex; and
    (c) doping the polyaniline emeraldine salt complex of the step (b) with a metal ion or a metal salt to prepare an insoluble polyaniline/metal complex,
    wherein the metal ion or the metal salt of the step (c) includes silver (Ag) and is contained in an amount of 5 to 30 wt. % with respect to the conductive polyaniline polymer.

* * * * *